United States Patent
Hart et al.

(10) Patent No.: US 7,101,116 B2
(45) Date of Patent: Sep. 5, 2006

(54) CABLE OR PIPE RETRIEVAL AND BURIAL APPARATUS AND METHODS

(75) Inventors: Phil Hart, Clacton-on-sea (GB); Keith Dicker, Shalford (GB); Adrian Windows, Chelmsford (GB)

(73) Assignee: Global Marine Systems Limited, Essex (GB)

( * ) Notice: Subject to any disclaimer, the term of this patent is extended or adjusted under 35 U.S.C. 154(b) by 0 days.

(21) Appl. No.: 10/491,583

(22) PCT Filed: Oct. 1, 2002

(86) PCT No.: PCT/GB02/04396

§ 371 (c)(1),
(2), (4) Date: Oct. 1, 2004

(87) PCT Pub. No.: WO03/029568

PCT Pub. Date: Apr. 10, 2003

(65) Prior Publication Data

US 2005/0063785 A1    Mar. 24, 2005

(30) Foreign Application Priority Data

Oct. 2, 2001    (GB)    .................................    0123658.7

(51) Int. Cl.
*E02F 5/10*    (2006.01)
*F16L 1/16*    (2006.01)
(52) U.S. Cl. ...................... 405/159; 405/158; 405/164; 405/173

(58) Field of Classification Search ................ 405/158, 405/159, 164, 173
See application file for complete search history.

(56) References Cited

U.S. PATENT DOCUMENTS

| 815,163 | A | * | 3/1906 | Hatfield | ....................... 405/164 |
| 3,319,426 | A | * | 5/1967 | Slonczewski | ............... 405/173 |
| 3,641,780 | A | * | 2/1972 | Ede | ............................. 405/159 |

(Continued)

FOREIGN PATENT DOCUMENTS

EP    0 828 031 A1    3/1998

(Continued)

*Primary Examiner*—Frederick L. Lagman
(74) *Attorney, Agent, or Firm*—Townsend and Townsend and Crew LLP (57) ABSTRACT

An apparatus for retrieving a cable or pipe buried under water in bed material comprises a shank (2) having a first surface and a fluke member (5) having a second surface. When the apparatus is towed in a towing direction, the fluke member (5) and shank (2) become buried in the bed material to a predetermined depth suitable for retrieving the cable or pipe. The first and second surfaces are arranged such that under normal working conditions the interaction between the material and at least the first and second surfaces generate opposing forces in these surfaces causing the apparatus to be maintained at substantially the predetermined depth. The apparatus may also be adapted for burial of a cable or pipe by ploughing a furrow in the bed material into which the cable or pipe is supplied using guiding means.

70 Claims, 6 Drawing Sheets

U.S. PATENT DOCUMENTS

| | | | |
|---|---|---|---|
| 3,788,085 A * | 1/1974 | Holberg | 405/164 |
| 4,053,998 A * | 10/1977 | Ezoe | 405/159 |
| 4,245,927 A * | 1/1981 | Wharton | 405/164 |
| 4,312,144 A * | 1/1982 | Ezoe | 405/159 |
| 4,832,531 A | 5/1989 | Paulovits | |
| 4,844,658 A * | 7/1989 | Kohn | 405/159 |
| 4,892,443 A * | 1/1990 | Kunze et al. | 405/164 |
| 5,203,599 A * | 4/1993 | Lewis et al. | 405/158 |
| 5,456,551 A | 10/1995 | Saxon | |
| 5,988,948 A * | 11/1999 | Featherstone | 405/164 |
| 6,435,772 B1 * | 8/2002 | Reece | 405/164 |
| 6,837,653 B1 * | 1/2005 | Grinsted | 405/164 |

FOREIGN PATENT DOCUMENTS

| | | | |
|---|---|---|---|
| EP | 0 989 651 A1 | 3/2000 | |
| JP | 404004716 | * 1/1992 | 405/173 |

* cited by examiner

CABLE OR PIPE RETRIEVAL AND BURIAL APPARATUS AND METHODS

The present invention relates to a retrieval apparatus and method for retrieving a cable or pipe buried underwater in bed material and to an apparatus and method for burying a cable or pipe.

It is well known for cables or pipes to be laid under expansive regions of water such as oceans, in order to provide power or communication links between regions or nations. Rather than simply laying such cables or pipes on the surface of the bed material, such as the seabed, it is beneficial to physically bury these within the material itself. This provides a more stable and protective environment for the cable or pipe and in particular prevents damage or severance by commercial fishing activities.

The burial depth beneath the surface of the bed material is dependent upon the function of the cable or pipe, the location, and the type of material from which the seabed is formed. Typical burial depths range between 1 and 4 metres.

In certain kinds of fishing activities, the "otter boards" of nets routinely penetrate the surface of the seabed and it is important therefore that the cables or pipes are buried beyond their reach. However recently, developments in fishing practices have caused an increase in these penetration depths and as a consequence it has become necessary to increase the burial depths of cables or pipes in some parts of the world.

There are a number of technical problems associated with increasing the burial depths and in general, larger apparatus is needed for the burial, access or retrieval operations at such greater depths. This also has associated disadvantages in terms of cost.

Cables or pipes are conventionally retrieved from their burial position using a "grapnel". This is formed from two major components, a shank which rests upon the seabed and a fluke attached to the shank. The fluke penetrates the seabed to a depth sufficient to engage the cable or pipe. The shank and fluke therefore effectively operate as a hook and, as the shank is towed across the surface of the seabed by a surface vessel, the fluke is dragged through the sub-seabed material until contact is made with the cable or pipe. The operational retrieval depth of the grapnel is determined by the length of the fluke and it is well established with conventional grapnel designs that the shank length should be about three times that of the fluke. For this reason, grapnels for the retrieval of deep cables are large and heavy.

A towing line, for example in the form of a long chain, connects the surface vessel to the shank and the tension within this chain is monitored during the towing operation. When a cable or pipe is engaged by the fluke, the tension within the towing line increases. The fluke is angled such that the cable or pipe is brought to the surface of the seabed and further conventional recovery operations are then performed, for example using submersible remotely operated vehicles (ROVs).

With reference to underwater cables, various cable sizes are used depending upon their function such as power transmission or communications. For example an armoured power cable may have a typical diameter of 100 mm whereas a lightweight fibre optic communications cable may only have a diameter of about 15 mm. As the cables are typically located by detecting an increase in the towing line tension, there is a significant risk that smaller diameter cables, which are in general weaker, will be simply severed by the grapnel due to the large towing force used.

This is a particular problem at large burial depths where larger and heavier grapnels are used and the corresponding towing force is greater. In this case the increase in tension caused by contact with the cable is more difficult to detect, as it is a smaller fraction of the total towing tension.

For example, a typical towing force for a grapnel designed to recover a cable buried at 2.5 metres, may be up to 40 tonnes, whereas a typical fibre optic cable can only withstand a uniaxial tension of up to about 30 tonnes.

EP-A-0828031 discloses an underwater plough having a first share and a moveable second share such that the depth of the ploughing profile presented by the plough can be varied. In an alternative approach, U.S. Pat. No. 5,456,551 discloses an underwater self-guided system for trenching bed material.

In accordance with a first aspect of the present invention we provide a retrieval apparatus comprising:
a shank having a first surface; and
a fluke member having a second surface,
wherein under normal working conditions, when the apparatus is towed in a towing direction the fluke member and at least part of the shank become buried in the bed material to a predetermined depth suitable for retrieving the cable or pipe, and wherein the first and second surfaces are arranged with respect to one another such that under the normal working conditions the interaction between the bed material and at least the first and second surfaces generates opposing forces in the first and second surfaces causing the apparatus to be maintained at substantially the predetermined depth.

We have realised that many of the prior art problems can be addressed by utilising retrieval apparatus that does not rely upon the provision of a shank that rides along the surface of the bed material. In contrast, in the retrieval apparatus of the present invention, at least part of the shank becomes buried in use and in many cases the shank and fluke member become totally submerged in the bed material during towing.

We have also realised that the same approach can be applied to cable and pipe burial. Thus, in accordance with a second aspect of the present invention, apparatus for burying a cable or pipe underwater in bed material, comprises
a shank having a first surface; and
a fluke member having a second surface,
wherein under normal working conditions when the apparatus is towed in a towing direction the fluke member and at least part of the shank first surface becomes buried in the bed material to a predetermined depth so as to plough a furrow suitable for burying the cable or pipe, and wherein the first and second surfaces are arranged with respect to one another such that under the normal working conditions the interaction between the bed material and at least the buried parts of the first and second surfaces generates opposing forces in the first and second surfaces causing the apparatus to be maintained at substantially the predetermined depth; and means for guiding a cable or pipe into the furrow.

The guiding means may comprises a tube, hoops, flaps or fingers and therefore need not fully enclose the cable or pipe. It has been found that the bed material tends to flow around the shank during towing and this material maintains its position for a short time after the shank has passed creating a kind of bow wave effect. This allows the cable or pipe, along with any associated apparatus, to be buried by passing along the rear of the shank into the furrow. The flaps or fingers may be static or arranged to be moveable hydraulically to widen the furrow so as to allow easier burial of larger apparatus such as repeaters.

Conveniently, for retrieval or burial operations, the apparatus may be arranged to operate at any desired predetermined depth. Large predetermined depths, for example greater than 2 metres, are therefore achievable without the need to greatly increase the size and mass of the apparatus. Unlike in known apparatus, the shank of the present invention may be used to engage the cable or pipe, rather than only a fluke being provided to perform this function. As a result, the overall dimensions and mass of the apparatus can be reduced with respect to known grapnels. In one example of apparatus according to the invention used for cable recovery at 2.5 metres, the typical mass of the apparatus is around 1 tonne whereas an equivalent conventional grapnel has a mass in the order of 3 tonnes.

A major advantage of this is that, particularly for deep cables or pipes, the corresponding towing force is lower with respect to conventional grapnels and ploughs. In the case of retrieval, this allows cables or pipes of small diameter to be detected with less likelihood of damage.

A potential reduction in the size of the apparatus and the corresponding towing force is also favourable economically as the overall cost of a retrieval or ploughing operation can be reduced. The invention also provides potential for future retrieval or burial of cables or pipes at even greater depths than those presently used, whereas the scaling up of conventional apparatus would become increasingly prohibitive in terms of cost and ease of detection during towing.

The apparatus is designed to operate at a particular predetermined depth by consideration of the mass of the apparatus, the typical bed material for example clays or sands which can have shear strengths up to 300 kPa or more, the dimensions and arrangement of the components and, in particular, the arrangement of the first and second surfaces. The towing speed has a direct affect on the tow forces seen, though not the operation of the device and so low towing speeds should be used of approx 0.5–1 km/hr.

Typically, under normal working conditions, the first surface is inclined downwards such that an upwards force component is generated in the shank as it passes through the bed material. Accordingly the second surface is inclined upwards such that a downward force component is generated in the fluke member as it passes through the bed material.

In many cases the entire shank and fluke member become buried during a retrieval or burial operation at the predetermined depth. Typically the apparatus further comprises a towing member attached to the shank, such as a chain or steel cable. When the shank is fully buried, under normal working conditions at least part of the towing member interacts that the bed material such that the apparatus is maintained at the predetermined depth. Therefore preferably consideration is given to the interaction between the bed material and the towing member. The means used to tow the apparatus, such as a ship, does not provide an upward force.

The towing member may therefore be either flexible or a rigid member and when rigid, preferably the shank is adapted to be pivotably coupled to the towing member during use. Preferably the towing member also further comprises a skid member which is adapted in use to remain upon the surface of the bed material when the apparatus is at the predetermined depth. The towing member may comprise one or more rigid links. Preferably each of these links are pivotably coupled to one another. In general such links take an elongate form although one or more of them may actually comprise an additional shank and fluke member, these having surfaces arranged with respect to one another such that under normal working conditions the interaction between the bed material and the surfaces generates opposing forces such that the apparatus is maintained at the predetermined depth during use. In this way, a number of such grapnels may be linked together to attain greater depth of retrieval or burial.

Preferably the apparatus further comprises one or more further interaction surfaces adapted in use to interact with the bed material so as to generate forces of a similar sense to those of the first and/or the second surfaces. Preferably these are arranged as "wings" or small side plates. The wings may therefore be provided on a link (if present) or for example on the shank of the apparatus. Typically one or more wings may be provided upon any of these.

The wings may therefore be adapted to generate upward or downward forces depending upon the respective configuration of the first and second surfaces. Preferably however the wings are provided to produce a force in the similar sense to that of the second surface provided by the fluke member. The use of such further interaction surfaces produces additional forces which allow for a smaller fluke member surface to be used for a given predetermined operational depth. When used in association with links, these give extra rotation of the link or shank and therefore an increased penetration depth.

An angle can be defined between an interaction surface with respect to the surface of the bed material when the apparatus is at the starting position. Typically this angle is between 30° and 55° to aid with the initial burial process.

It is desirable to minimise the towing force required to tow the retrieval or burial apparatus and it is also desirable that, when at the predetermined depth, even though the apparatus may be towed from above the seabed, there will be no net rotation of the apparatus such that its profile with respect to the towing direction remains substantially constant.

Typically therefore the shank is arranged to be elongate and, during towing, the elongate length of the shank is arranged along the towing direction, although at an angle to it in order to generate a force upon the first surface. Although the fluke member could be attached directly to the shank, preferably the shank has an elongate section defining an axis and a further separator section having a distal end spatially separated from this axis. Preferably the fluke member is attached to the distal end of the separator section as this increases the vertical range of potential engagement with the cable or pipe. The separator section is generally positioned rearward with respect to the fluke member and shank such that, once engaged, the cable or pipe is retained adjacent to the separator section.

Preferably, the second surface of the fluke member (or any additional fluke member acting as a link) is substantially wider in cross-section with respect to the towing direction than that of the shank (or any additional shank). Each fluke member is typically approximately planar and arranged such that an upper planar surface, operating as the second surface, has a plane normal which is almost orthogonal to the towing direction, although angled slightly (by a few degrees of angle) towards this direction such that a force is generated upon the second surface.

A component of the towing direction resolved onto the second surface of the fluke member is therefore preferably at an angle of 10 degrees or less with respect to the towing direction, and more preferably at substantially 2 degrees with respect to the towing direction. The angle that the fluke member eventually reaches and maintains during a towing run is dependent upon a number of factors such as the bed material type and the dimensions of the apparatus. It will be appreciated that a smaller angle reduces drag but also generates a smaller vertical force with respect to larger angles.

Preferably the second surface of each fluke member, when viewed along the normal to the second surface, is arranged such that it narrows to two tips, one arranged upon each side of the shank, and projecting generally in the towing direction. These tips allow the apparatus to position itself upright upon the bed material prior to any penetration without additional support. They also cause a greater area of the fluke member to penetrate the bed material initially thereby providing a greater downward force before the shank contacts the bed material. This increases the "pull in" force and therefore aids penetration.

The first surface of the shank is typically elongate and narrow with respect to the planar surface of the fluke member. The first surface therefore provides a relatively long interaction length in the direction of the towing direction and this, in cooperation with the second surface, maintains the rotational and vertical orientation of the apparatus during towing.

Although the shank is typically elongate, it is riot necessary for this to be of a linear form and indeed curved shapes can be used, one example being that of a horseshoe. Although any shape of shank can be used as long as a suitable first surface is provided, it is beneficial to curve the shank away from the bed material as this allows more of the fluke member to enter the bed material before the shank contacts with it, such contact generating an upward force working against bed penetration. However, the apparatus is preferably arranged such that when in use in a starting position on the surface of the bed material before burial, the apparatus is adapted such that the second surface is at an angle of between 30° and 55° to the surface of the bed material. This angle is preferably the same angle as that made by any additional interaction surfaces (where present) with the bed material.

The end of the shank distal to the separator section is typically used for connection to the towing member, as this end is foremost with respect to the towing direction.

The retrieval or burial apparatus according to the invention is also advantageous in that it does not require initial burial to the predetermined depth in order to operate. It may be simply placed upon the surface of the bed material with the second surface of the fluke member (and those of any additional interaction surfaces) angled towards the bed material such that when the apparatus is first towed, the second surface bites into the bed material and the apparatus is dragged beneath the surface. The apparatus therefore provides a self-burying function.

In accordance with a third aspect of the present invention a method of retrieving a cable or pipe buried underwater in a bed material at a certain depth comprises:

towing retrieval apparatus according to the first aspect of the invention, wherein the apparatus is arranged for use at a certain depth, until the cable or pipe is engaged; and, retrieving the cable or pipe.

Typically a surface vessel such as a ship is provided as a towing means and is used to perform the towing operation. Preferably the method further comprises the step of positioning the apparatus on the surface of the bed material prior to towing, such that when the towing step is performed, the apparatus interacts with the bed material and moves to the predetermined depth.

In some cases the towing operation may be performed by a towing means in the form of a submersible remotely operated vehicle (ROV) on the surface of the bed material.

This is particularly beneficial where more lightweight cables or pipes are used, for example in environments such as lakes and rivers. The ROV may tow the apparatus remotely and therefore be separated from the apparatus during the operation. Alternatively the ROV may be directly coupled to the apparatus at a hitch point.

Typically, when the cable or pipe is engaged, the method further comprises detecting contact between the cable or pipe and the retrieval apparatus, for example by monitoring the tension in the tow line. Following engagement, the method typically further comprises terminating the towing operation and raising the cable or pipe to the surface of the bed material using the retrieval apparatus.

In accordance with a fourth aspect of the present invention, a method of burying a cable or pipe in a bed material at a certain depth, comprises towing apparatus according to the second aspect of the present invention to plough a furrow at the certain depth; and, supplying the cable or pipe to the furrow.

An ROV can also be used to perform the towing operation to bury the cable or pipe, either towing the apparatus remotely or by being directly coupled to it. The cable may be dispensed from a "glue pot" or reel positioned aboard the ROV or aboard the ploughing apparatus itself.

A further advantage of the present apparatus is that the operational depth of the apparatus is more constant than in known apparatus. This is because typically such conventional apparatus uses wheels or skids to reduce the towing force and the shank may be deflected vertically during towing along the surface of the bed material due to surface contours. This produces a corresponding motion within the fluke beneath. This does not generally occur with the present invention as the shank is at least partially buried and in many cases will be completely buried beneath the bed material.

Examples of retrieval and burial apparatus and methods in accordance with the present invention will now be described and contrasted with known apparatus with reference to the accompanying drawings, in which.

Figure 1:
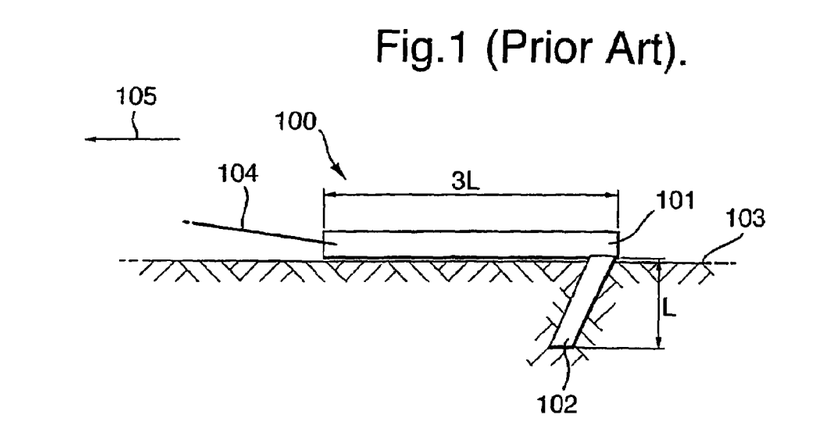
FIG. 1 shows an illustration of a known grapnel.

FIG. 1 shows a conventional cable recovery grapnel 100. This has a shank 101 and a fluke 102 attached to one end of the shank. The shank is positioned on the surface of the seabed 103 with the fluke 102 penetrating the seabed. A tow wire 104 allows the grapnel to be towed in the towing direction 105 by a remote surface vessel (not shown).

As shown in FIG. 1, the conventional approach to grapnel design for achieving seabed penetration is that the length of the grapnel shank is approximately three times that of the fluke. As has been stated, in order to obtain a penetration depth of 3 metres, a grapnel shank having a length of approximately 9 metres is used. The mass of such a grapnel is typically between 3 and 5 tonnes. This requires a large towing force to be transmitted to the grapnel through the tow wire 104. Such a force may be up to 40 tonnes although this will be dependent upon the exact design of the shank, the fluke and the material of the seabed.

Figure 2:
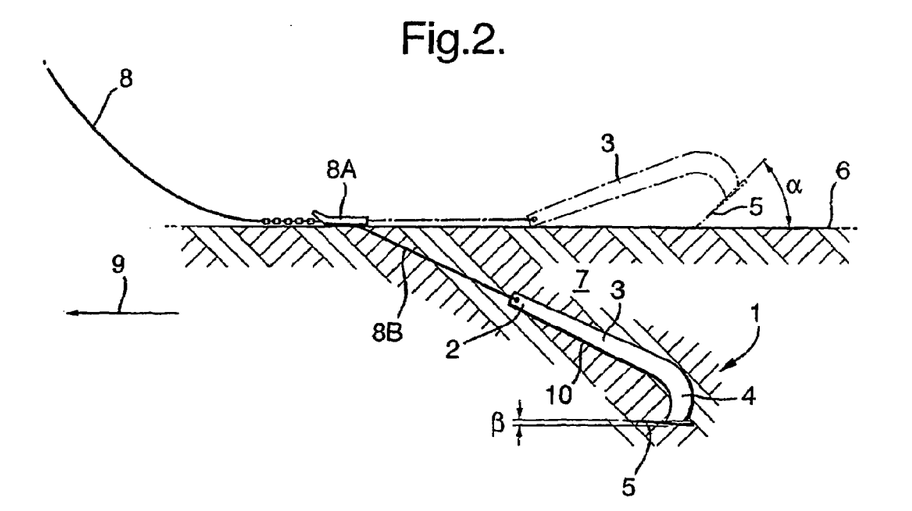
FIG. 2 is an illustration of a self-burying grapnel according to a first example.

FIG. 2 shows an example of a grapnel 1 according to the present invention both in its initial position resting on the seabed 6 and following burial. This has a shank 2 having an elongate section 3 and a separator section 4. The total length of the shank 2 is about 1 metre. A fluke member 5 is attached to the end of the separator section 4 of the shank 2. A tow line 8 in the form of a chain is attached to a remote surface vessel (not shown) which is used to tow the grapnel 1 through the seabed material 7 in a towing direction 9.

The tow line 8 is connected to a skid plate 8A (skid member) which is connected to the shank 3 by a solid link 8B. It has been found that the link 8B should be of solid construction to improve performance by providing some torsional stiffness to the system to help prevent the grapnel rotating sideways if it hits a boulder or the like. Optimum lengths for this link 8B are given in Table 1 below. For the longer lengths of link, it may be useful to include a method of articulating the link in order to make it easier to handle (as described later). A typical size for each link section will be a length of 2.5 m, a width of about 20 mm and a breadth of about 150 mm.

The skid plate 8A helps provide extra stability to the system.

A lower surface of the elongate section 3 presents a first surface 10 to the seabed material 7 as the grapnel is towed in the towing direction 9. This generates a vertical force component and a horizontal force component acting on the elongate section 3 of the shank 2.

Figure 3:
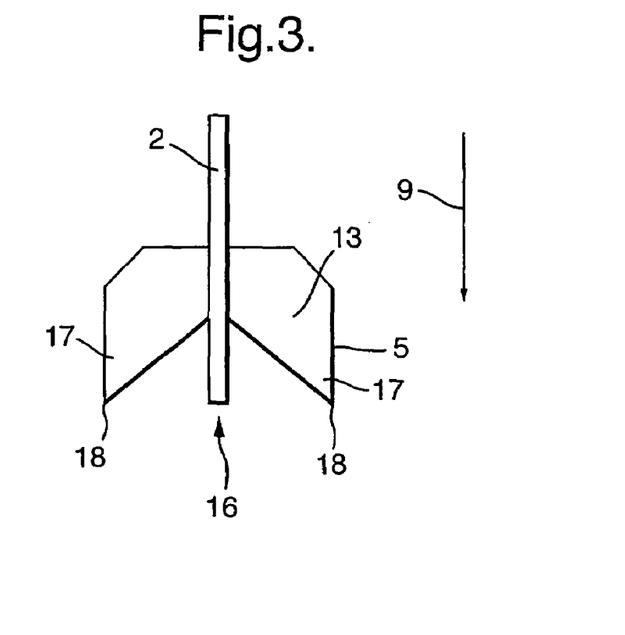
FIG. 3 shows the arrangement of the fluke member in the first example.

The fluke member 5 attached to the end of the separator section 4, is approximately planar having an expansive upper surface 13 (FIG. 3). This forms a second surface for interaction with the bed material 7 as the grapnel 1 is towed in the towing direction 9. The second surface 13 makes an angle β with that of the towing direction 9 (as shown in FIG. 2). The angle β is dependent upon the design of the apparatus and the relative size of the surface 13. In this case β is about 2°. The interaction with the seabed material 7 generates a downward force component and a horizontal force component within the fluke member.

As shown in FIG. 2, the angle of the fluke tip relative to the seabed before it actually penetrates is defined as the rake angle or penetration angle α. This is dependent upon the sea bed material type and typically lies between approximately 30° and 55°. Typically in clays 30° to 35° is appropriate, whereas in sands and sediments 40° to 55° should be used. For general use in soft soils an angle of about 45° gives good results.

It has also been found in this case that the depth at which the grapnel 1 is maintained during towing is mainly dependent upon the length of the link 8B and of the elongate section 3.

FIG. 3 shows the fluke member 5 as viewed normal to the second surface 13. The towing direction 9 is also indicated (as mentioned above). It can be seen that the shank 2 is rectangular in cross-section with a narrow dimension 16 in the transverse direction with respect to the towing direction 9. This serves to reduce the drag caused by the shank 2 during towing. The second surface 13 is generally rectangular and example dimensions are given in Table 1 below. Although the second surface 13 of the fluke member 5 therefore has a considerable surface area, it should be remembered that this surface is presented at a small angle to the towing direction 9 and indeed the cross-section of this member is also very limited to reduce drag as shown in FIG. 2.

Table 1 below shows the typical dimensions for the grapnel required for burial depths of 1 m–3 m.

TABLE 1

| Max depth (m) | Link Length (m) | Plate size (mm) | Shank length (mm) | Shank width (mm) |
|---|---|---|---|---|
| 1 | 9 | 250 × 130 | 300 | 20 mm |
| 2 | 10 | 700 × 350 | 840 | 25 mm |
| 3 | 12 | 1140 × 570 | 1370 | 25 mm |

The second surface 13 has an equal surface area on either side of the shank 2 and has sharpened triangular regions 17 in the forward part of this surface with respect to the towing direction 9. Each of these triangular regions terminates in points 18 which act as knives and aid the slicing of the fluke member 5 into the seabed material 7, along with stabilising the apparatus prior to penetration.

A retrieval operation for recovering a buried underwater cable using the apparatus described above, will now be discussed with reference to FIGS. 4, 5a and 5b.

Figure 4:
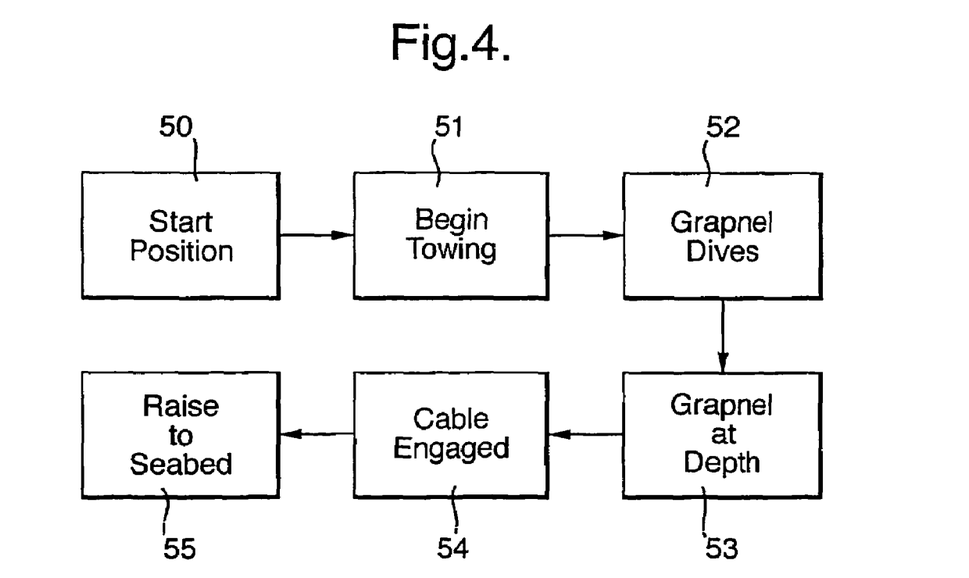
FIG. 4 is a flow diagram of the example method.
Figure 5A:
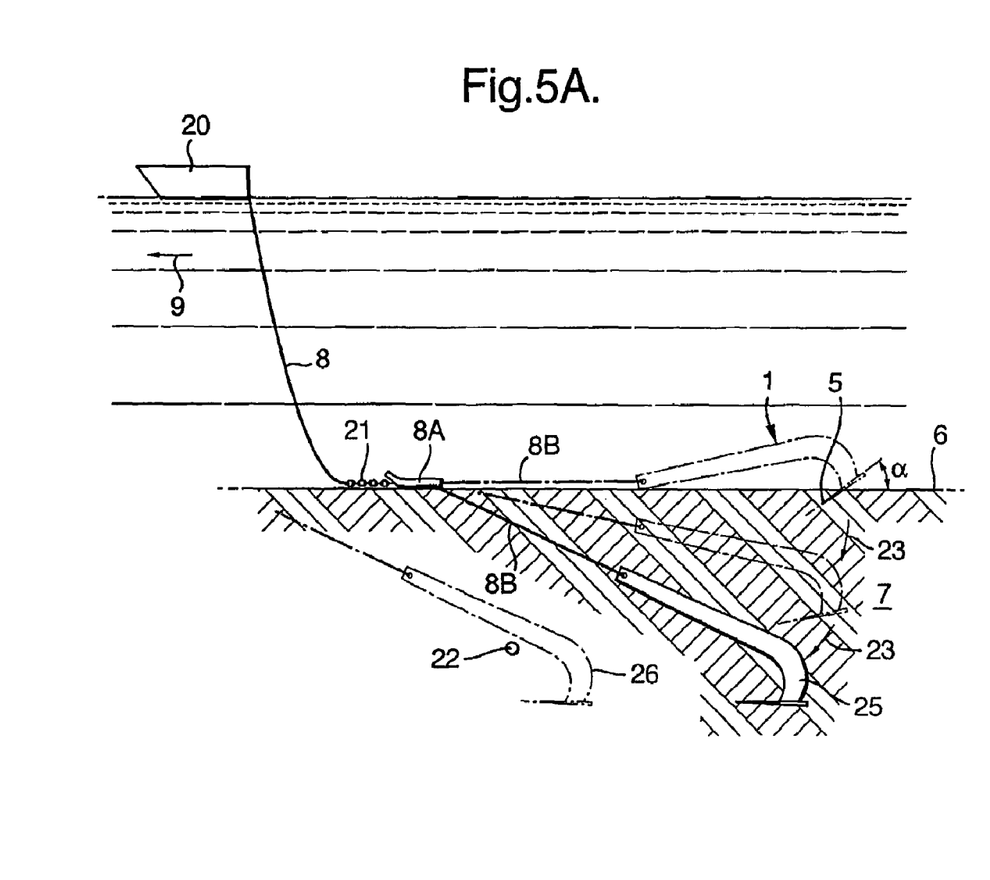
FIG. 5a illustrates a self-burying and retrieval operation according to the first example.
Figure 5B:
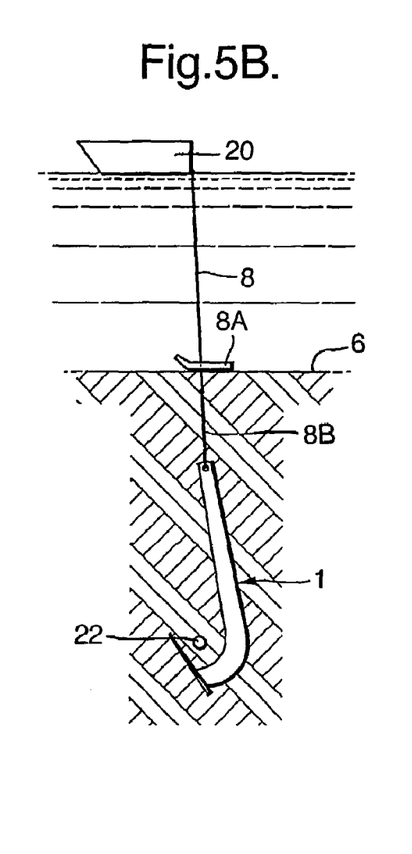
FIG. 5b shows the raising of a cable to the seabed following engagement.

The retrieval operation begins at step 50 in FIG. 4. As shown in FIG. 5a, the grapnel 1 is initially rested upon the seabed 6 in a start position with the fluke member angled downwards into the seabed 7 at angle α. The tow line 8 is connected to a surface vessel 20 which is spatially separated from the grapnel 1 in the towing direction 9 as indicated by the dashed section 21 of the tow line 8. As indicated in FIG. 5a, an undersea cable 22 is buried at a certain depth ahead of the grapnel in the towing direction. As the depth of burial of this cable 22 is known, a grapnel having an operational depth suitable for the recovery of the cable 22 is selected beforehand.

The surface vessel then begins to move in the towing direction at a suitable speed (step 51 of FIG. 4). This causes the fluke member 5 of the grapnel 1 to dig into the seabed material 7. At this stage the downward force upon the fluke member 5 is much greater than any upwards force of the first surface 10 of the shank 3 and therefore the grapnel 1 dives at step 52 of FIG. 4 as the towing operation proceeds. As the diving continues, the grapnel begins to rotate as the shank becomes buried and the seabed material 7 begins to interact with the surface 10. This is indicated by the arrows 23 in FIG. 5a.

The rotation of the grapnel 1 presents a reduced second surface area 13 and an increased first surface area 10 with respect to the towing direction. As the grapnel 1 rotates, the upward force component upon the shank 3 increases and the downward force component upon the fluke member 5 decreases.

As the burial depth of the grapnel 1 increases, the link 8A also becomes buried and generates a vertical force component on the grapnel, along with a horizontal force component. The system eventually stabilises such that the upward forces upon the link 8B and first surface 10 are opposed by the downward force upon the surface 13 at the angle β to the towing direction 9, along with the weight of the grapnel and chain as a whole. Although the links and the towing line are connected, the towing line is used purely to drag the grapnel forward, the links are used for the various depth penetrations (i.e. the longer the link, the deeper the burial). At this point there is also no longer any net rotational or vertical force upon the grapnel. Therefore at step 53 of FIG. 4, the grapnel maintains its desired depth. As the towing continues, the grapnel 1 moves through the material 7 at an approximately constant depth as indicated at 25 in FIG. 5*a*.

The tension in the towing line 8 is a function of the total drag produced by the grapnel 1 as a whole including the horizontal force components, along with that of the towing line itself.

The grapnel later reaches a position 26 such that the cable 22 is engaged by the elongate section 3 of the shank 2. This occurs at step 54 in FIG. 4 and at this point an increase in the tension within the towing line 8 is detected using a suitable monitoring device aboard the vessel 20. As the cable 22 is engaged, it moves along the elongate section 3 of the shank 2 and into the region adjacent the separator section 4. The cable 22 is therefore effectively hooked and the vessel 20 is then repositioned in front of or directly above the grapnel as indicated in FIG. 5*b*.

The towing line 8 is usually recovered aboard the vessel under tension as it approaches the grapnel. As the tow line approaches a more vertical attitude, the grapnel 1 with shank 2 rotates about the cable to a more vertical attitude. The cable 22 is retained between the fluke member 5 and the shank 3 adjacent the separator section 4.

At step 55 of FIG. 4, as the towing line 8 is winched aboard the vessel 20, the grapnel 1 is drawn upwards through the seabed material 7, thereby drawing the cable with it. Thus the cable 22 is brought to the surface of the seabed 6. Once at the seabed surface, further conventional routine cable maintenance and recovery operations can be performed, for example using ROVs to sever the cable in order to allow the two ends to be brought onboard the deck of the surface vessel 20.

Figure 6:
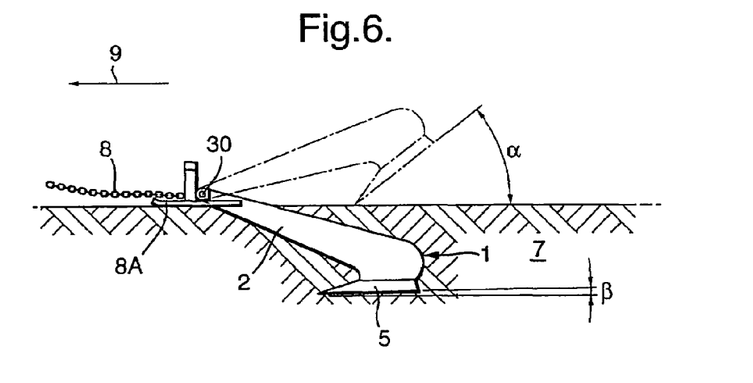
FIG. 6 shows a second example of retrieval apparatus pivotably coupled to a skid plate.

FIG. 6 shows another example of the present invention in which similar apparatus to that described earlier is indicated with similar reference numerals. In this embodiment a grapnel is provided which is adapted to be fitted in use with modular articulated links so as to provide the ability to use the grapnel for cable or pipe recovery or burial at various depths. In FIG. 6, such a grapnel 1 is shown without any links at all and is therefore pivotably attached directly to the skid plate 8A at a "hitch-point" 30. FIG. 6 also shows the starting position of the grapnel for entry into the bed material 7, in this the "rake" or "penetration" angle α is about 40°, this angle being the angle that the fluke member 5 makes with the seabed 7.

As in the previous example, the operational position of the grapnel is also shown, as is the angle β, which is the angle made between the surface 13 of the fluke member 5 and the horizontal. In this case the angle β to give minimum tow tension would be about 2°. This is dependent upon several factors such as grapnel geometry and soil conditions and a range of 2° to 10° is normal.

The arrangement described is suitable for a reasonably shallow retrieval depth. However, for greater depths, one or more links 8B are used, each being pivotably connected to one another, to the hitch point 30 and to the shank of grapnel 2.

In this example, when a number of links are provided (for example two or three), the steady-state configuration adopted by the train of links and the grapnel 1 is not linear, and is rather a downward curve into the seabed material 7. The effect of such a linked system is that the overall towing force required is reduced compared with a large single device of similar size. In particular, the pivotable couplings between each firm, the hinge point 30 and the grapnel, greatly reduce the forces required to rotate the grapnel to the position shown in FIG. 5*b* when the cable or pipe has been engaged. This is because parts of the apparatus can individually pivot one at a time rather than the entire combined apparatus being forced into a new configuration at once. This reduces the overall structural strength requirements of the apparatus.

The articulated links system described is also advantageous in that, for the retrieval of very deep cables or pipes, an increased number of links can be used with the same grapnel. Were these not pivoted at various points along the apparatus, the apparatus as a whole would be extremely difficult to manoeuvre on board the surface vessel both before and after recovery. Specifically, when the apparatus is drawn from the water and onto the surface of the vessel, it is generally hauled over a curved surface. In doing so it pivots at the various points which allows the apparatus to conform more easily with this surface. This in turn allows for the lifting apparatus to be much more compact. Furthermore, once on board the vessel, the respective links 8B can be decoupled or folded over so as to allow easy storage of the apparatus.

In use, during the initial burial process of a grapnel with multiple links 8B, the components of the apparatus bury themselves substantially in their order of arrangement from the grapnel end. Firstly the grapnel part of the apparatus dives into the bed material and rotates towards its operational position, with the other links remaining linearly arranged on the surface. The first link attached to the grapnel then begins to rotate about its pivot point with the next link (closer to the skid plate 8A), the remaining links staying upon the surface. Gradually as the burial continues, the links bury in order with the last link pivoting about the hinge point 30. The skid plate 8A remains upon the surface of the bed material 7.

Figure 7:
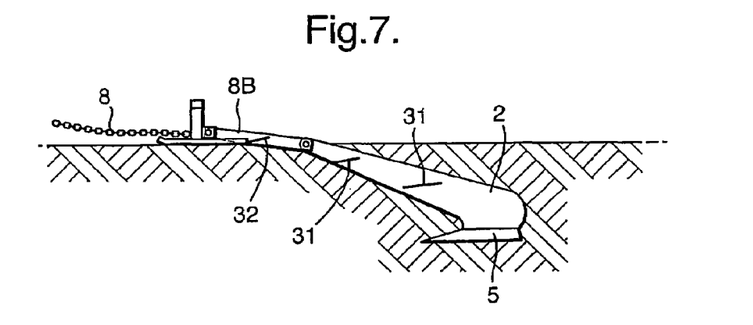
FIG. 7 shows a third example with a pivotable rigid link and additional wings.

As shown in FIG. 7, the apparatus can be provided with further interaction surfaces which act in the same manner as the surface 13 of the fluke member 5. A single link 8B is also shown. A typical length for such a link is between 1 and 2 metres.

In the present example, two further interaction surfaces are applied to the grapnel 1 as additional pairs of wings 31 (on either side of the apparatus) whereas a further pair of wings 32 is also added to the link 8B.

Figure 8A:
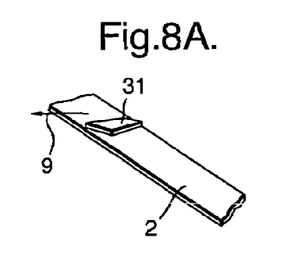
FIG. 8a is a perspective view of a wing.
Figure 8B:
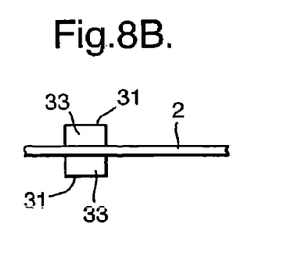
FIG. 8b shows the wings viewed from above.
Figure 8C:
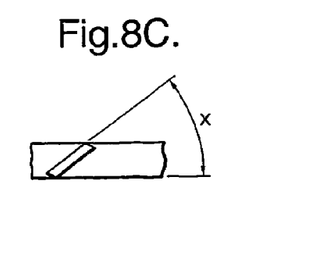
FIG. 8c illustrates the angle of a wing prior to burial.

These wings are more clearly shown in FIGS. 8*a*, 8*b* and 8*c*.

FIG. 8*a* shows a perspective view of a wing 31 attached to the side of the grapnel member 1. The towing direction 9 is also indicated. It should be noted that similar wings are provided on either side of the grapnel 1. In this case, these are angled at a similar angle β to that of the main fluke member 5. FIG. 8*b* shows a second view of the wings from above where the extent of the surfaces 33 with which the bed material interacts can be seen. FIG. 8*c*, illustrates the angling of the wings 31 or 32 with the body of respective grapnel shank 2 or link 8B. In this case the angle is denoted as X and this may typically be arranged such that when the wings are in the steady-state buried position, they make an angle of approximately β with the horizontal. As the links 8B and the grapnel 1 do not necessarily adopt a linear configuration when in their steady-state buried position, the actual angle X for each of the pairs of wings may be different.

The wings 31, 32 operate in a similar manner to the fluke member 5. However, they provide further advantage in that when the apparatus has engaged with the cable or pipe and it is required to be rotated for retrieval, this rotation is aided greatly by the use of a small number of individual surfaces (defined by surfaces 33 of the wings and the surface 13 of the fluke member 5) rather than a corresponding larger surface 13 upon a single fluke member 5. This significantly reduces the stresses within the apparatus whilst it is being rotated into the lifting position.

The overall operation of the apparatus however occurs in a similar manner since the surfaces of the link(s) and the grapnel shank 2 provide an upward force whereas those of the wings and the fluke member provide a downward force and it is these forces which are balanced so as to maintain the steady-state depth of the apparatus.

It will be appreciated that the apparatus described in any of the examples herein, may be towed from either a surface vessel or an ROV driven along the surface of the bed material (depending upon the towing force required). The ROV may therefore be coupled to the towing line 8 so as to remain separated from the apparatus or indeed it may replace the skid plate 8A as a skid member, in which case the apparatus is attached to the ROV using a hitch point 30 as described above.

Figure 9A:
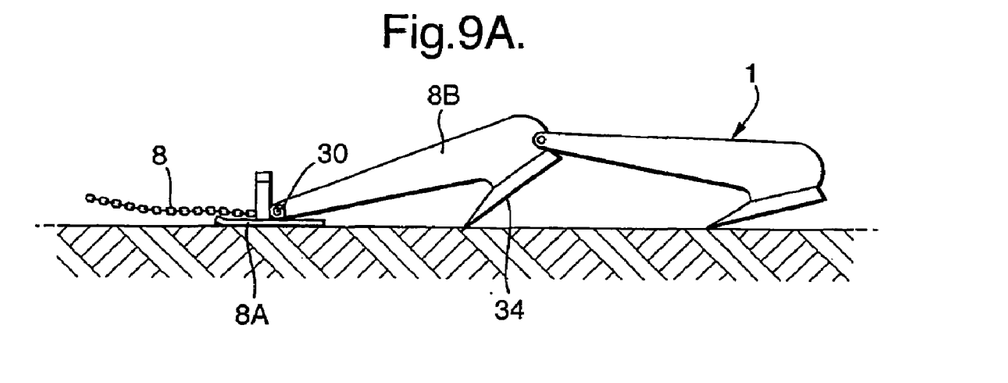
FIGS. 9a to 9d show the progressive burial of a fourth example of apparatus in which a grapnel is used as a link.
Figure 9B:
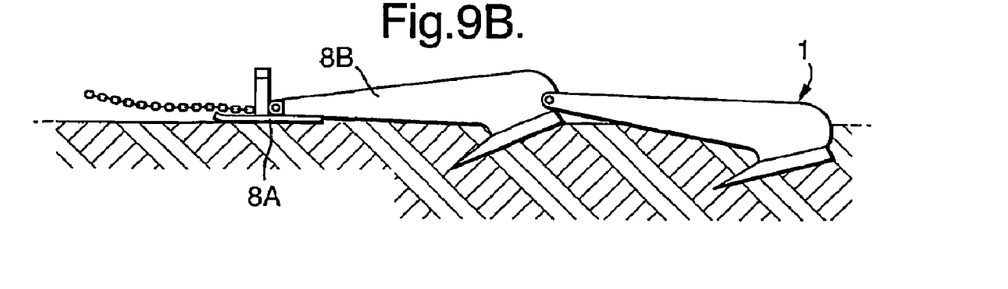
Figure 9C:
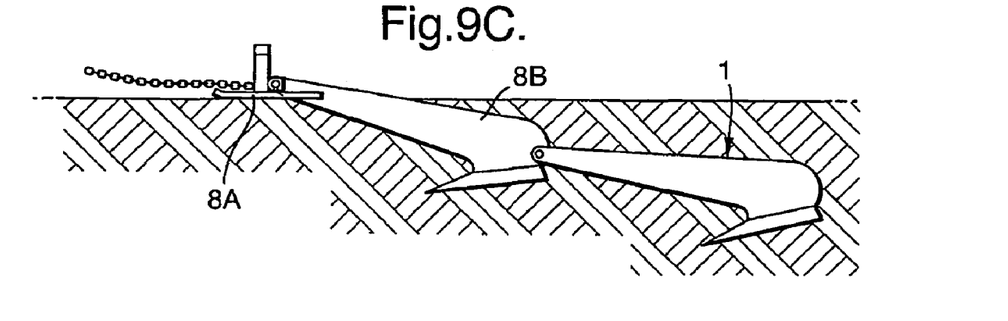
Figure 9D:
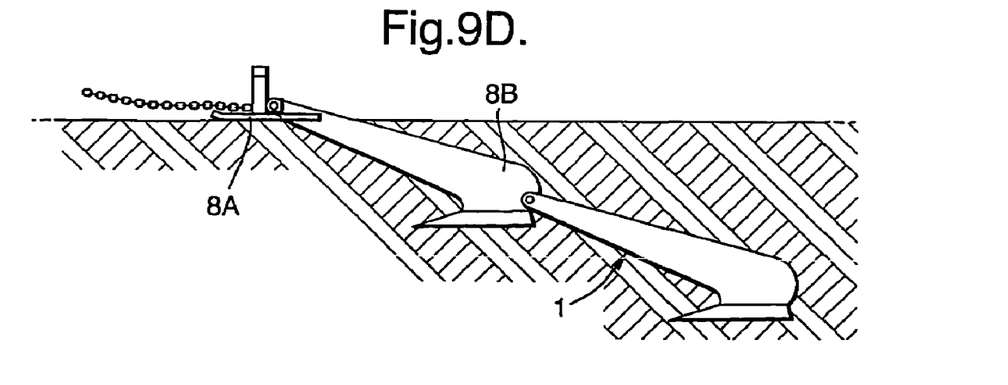

In a further embodiment as shown in FIGS. 9a to 9d, an actual grapnel is used as a link 8B, this having a fluke member 34. As shown in FIG. 9a, the skid plate 8A is again provided with a hitch point 30, to which is attached a first grapnel of the type discussed above in accordance with the earlier examples, this forming the link 8B. At the rear end of this link 8B a main grapnel 1 is pivotably coupled. The wings of the previous example are effectively therefore replaced by the fluke member 34 of the "link grapnel" 8B. FIGS. 9a to 9d show the progressive burial of this combined grapnel system to the desired steady-state operational depth. Although not shown in these Figures, the angle β for each of the two grapnels 8B, may be arranged to be different as the second grapnel is buried at a greater depth than the first during operation.

Figure 10:
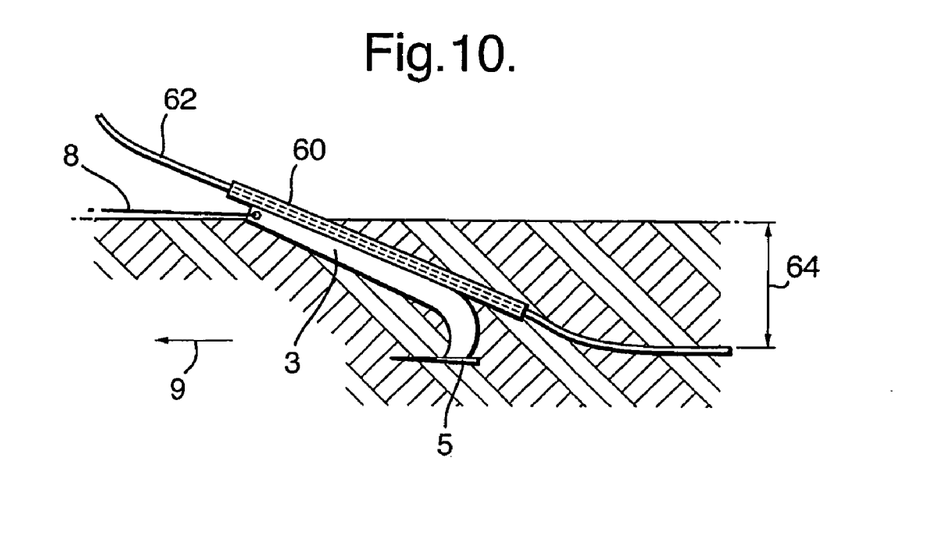
FIG. 10 is a view of an example of burial apparatus using a tube as guiding means; and, FIG. 11 shows an alternative example of burial apparatus using hoops as guiding means.

As mentioned above, the principles developed for use with the retrieval grapnels described above can also be applied to a burial plough as shown in FIG. 10. The plough shown in FIG. 10 comprises a shank 3 and fluke 5 similar to those shown in FIG. 2, the shank being connected to a towing ship via a tow wire 8. In this case, however, a guide tube 60 is mounted to the upper surface of the shank 3 and a cable 62 to be buried is guided through the tube 60 into a furrow 64 created by movement of the plough in the towing direction 9.

Figure 11:
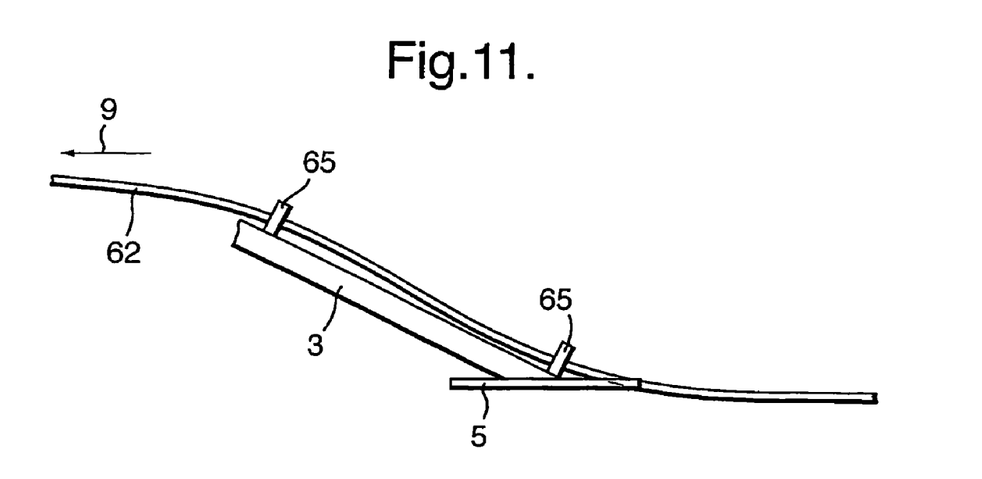

FIG. 11 shows an alternative example in which hoops 65 are positioned adjacent the top and bottom of the shank 3 on its upper surface to act as guiding means. Although friction with the bed material may attempt to pull the cable or pipe away from the shank 3, the tension within the cable or pipe during the laying operation ensures that it remains adjacent the shank 3 as required. As for cable or pipe retrieval, an ROV can be used as the towing means for a burial operation.

It should be noted that the burial plough as described above can therefore be used in association with any of the above examples so as to provide apparatus with a burial and a retrieval function.

The invention claimed is:

1. A retrieval apparatus for retrieving a cable or pipe buried underwater in bed material, the retrieval apparatus comprising:
   a shank having a first surface; and
   a fluke member having a second surface,
wherein
   under normal working conditions when the apparatus is towed in a towing direction the fluke member and at least part of the shank become buried in the bed material to a predetermined depth suitable for retrieving the cable or pipe,
   the second surface is substantially wider in cross section than the first surface with respect to the towing direction, and
   the first and second surfaces are arranged with respect to one another such that under the normal working conditions the interaction between the bed material and at least the first and second surfaces generates opposing forces in the first and second surfaces causing the apparatus to be maintained at substantially the predetermined depth.

2. A method of retrieving a cable or pipe buried underwater in a bed material at a certain depth, the method comprising:
   towing retrieval apparatus according to claim 1, wherein the apparatus is arranged for use at the certain depth until the cable or pipe is engaged; and,
   retrieving the cable or pipe.

3. A method to claim 2, further comprising, when the cable or pipe is engaged, detecting contact between the cable or pipe and the retrieval apparatus.

4. A method according to claim 2, further comprising terminating the towing operation following engaging the cable or pipe, and raising the cable or pipe to the surface of the bed material using the retrieval apparatus.

5. A method according to claim 2, further comprising the step of positioning the apparatus on the surface of the bed material prior to towing, such that when the towing step is performed, the apparatus interacts with the bed material and moves to the predetermined depth.

6. A method according to claim 2, further comprising towing the apparatus using a towing means.

7. A method according to claim 6, wherein the towing means is a surface vessel.

8. A method according to claim 6, wherein the towing means is a remotely operated vehicle.

9. A method according to claim 8, wherein the cable or pipe is supplied from dispensing means aboard the remotely operated vehicle.

10. Apparatus according to claim 1, wherein under normal working conditions the first surface is inclined downwards such that an upward force component is generated in the shank as it passes through the bed material.

11. Apparatus according to claim 1, wherein under normal working conditions the second surface is inclined upwards such that a downward force component is generated in the fluke member as it passes through the bed material.

12. Apparatus according to claim 1, wherein the shank is elongate.

13. Apparatus according to claim 12, wherein the shank has an elongate section defining an axis and a separator section having a distal end spatially separated from the axis.

14. Apparatus according to claim 13, wherein the fluke member is attached to the shank at or adjacent the distal end of the separator section.

15. Apparatus according to claim 1, further comprising a towing member attached to the shank, wherein under normal working conditions at least part of the towing member interacts with the bed material such that the apparatus is maintained at the predetermined depth.

16. Apparatus according to claim 15, wherein the shank is adapted to be pivotably coupled to the towing member during use.

17. Apparatus according to claim 15, wherein the towing member further comprises a skid member which is adapted in use to remain upon the surface of the bed material when the apparatus is at the predetermined depth.

18. Apparatus according to claim 17, wherein the skid member comprises a remotely operated vehicle adapted in use to tow the apparatus.

19. Apparatus according to claim 15, wherein part of the towing member is made up of one or more rigid links.

20. Apparatus according to claim 19, wherein the or each link and the shank are each pivotally coupled to one another.

21. Apparatus according to claim 19, wherein the links are adapted to be coupled and decoupled.

22. Apparatus according to claim 19, wherein one or more of the rigid links comprises an additional shank and fluke member, the additional shank and fluke member having surfaces arranged with respect to one another such that under the normal working conditions the interaction between the bed material and the surfaces generates opposing forces such that the apparatus is maintained at the predetermined depth during use.

23. Apparatus according to claim 22, wherein the surface of the additional fluke member, is substantially wider in cross section with respect to the towing direction, than that of the respective shank.

24. Apparatus according to claim 1, wherein the apparatus further comprises one or more further interaction surfaces adapted in use to interact with the bed material so as to generate forces of a similar sense to either the first and/or the second surfaces.

25. Apparatus according to claim 24, wherein the forces generated are of a similar sense to those generated by the fluke member.

26. Apparatus according to claim 25, wherein the further interaction surfaces are arranged as wings.

27. Apparatus according to claim 26, wherein each wing is arranged such that, when the apparatus is arranged in use in a starting position on the surface of the bed material, the wing makes an angle of between 30 and 55 degrees with respect to the bed material surface.

28. Apparatus according to claim 1, wherein, when the apparatus is arranged in use in a starting position on the surface of the bed material, the apparatus is adapted according to the bed material type such that the second surface is at an angle of between about 30 and 50 degrees to the surface of the bed material.

29. Apparatus according to claim 28, wherein the angle is in the range 30 to 35 degrees.

30. Apparatus according to claim 28, wherein the angle is in the range 40 to 55 degrees.

31. Apparatus according to claim 28, wherein the angle is substantially 45 degrees.

32. Apparatus according to claim 1, wherein under normal working conditions, a component of the towing direction resolved onto the second surface of the fluke member is at an angle of 10 degrees or less with respect to the towing direction.

33. Apparatus according to claim 32, wherein the component resolved onto the second surface is at an angle of substantially 2 degrees with respect to the towing direction.

34. An apparatus for burying a cable or pipe underwater in bed material, the apparatus comprising:
a shank having a first surface; and
a fluke member having a second surface, wherein
under normal working conditions when the apparatus is towed in a towing direction the fluke member and at least part of the shank first surface becomes buried in the bed material to a predetermined depth so as to plough a furrow suitable for burying the cable or pipe,
the second surface is substantially wider in cross section than the first surface with respect to the towing direction, and
the first and second surfaces are arranged with respect to one another such that under the normal working conditions the interaction between the bed material and at least the buried parts of the first and second surfaces generates opposing forces in the first and second surfaces causing the apparatus to be maintained at substantially the predetermined depth; and
means for guiding a cable or pipe into the furrow.

35. Apparatus according to claim 34, wherein the guiding means comprises one or more of a tube(s), finger(s) or flap(s) mounted to the shank.

36. Apparatus according to claim 34, wherein the guide means is adapted to be moveable and to interact with the bed material so as to control the width of the furrow.

37. Apparatus according to claim 34, wherein in use the cable or pipe is supplied to the furrow from a dispensing means.

38. Apparatus according to claim 37, wherein the dispensing means is provided upon the apparatus.

39. Apparatus according to claim 37, wherein the dispensing means is a glue pot or a reel.

40. Apparatus according to claim 34, wherein under normal working conditions the first surface is inclined downwards such that an upward force component is generated in the shank as it passes through the bed material.

41. Apparatus according to claim 40, wherein under normal working conditions the second surface is inclined upwards such that a downward force component is generated in the fluke member as it passes through the bed material.

42. Apparatus according to claim 34, wherein the shank is elongate.

43. Apparatus according to claim 42, wherein the shank has an elongate section defining an axis and a separator section having a distal end spatially separated from the axis.

44. Apparatus according to claim 43, wherein the fluke member is attached to the shank at or adjacent the distal end of the separator section.

45. Apparatus according to claim 34, further comprising a towing member attached to the shank, wherein under normal working conditions at least part of the towing member interacts with the bed material such that the apparatus is maintained at the predetermined depth.

46. Apparatus according to claim 45, wherein the shank is adapted to be pivotably coupled to the towing member during use.

47. Apparatus according to claim 45, wherein the towing member further comprises a skid member which is adapted in use to remain upon the surface of the bed material when the apparatus is at the predetermined depth.

48. Apparatus according to claim 47, wherein the skid member comprises a remotely operated vehicle adapted in use to tow the apparatus.

49. Apparatus according to claim 45, wherein part of the towing member is made up of one or more rigid links.

50. Apparatus according to claim 49, wherein the or each link and the shank are each pivotally coupled to one another.

51. Apparatus according to claim 49, wherein the links are adapted to be coupled and decoupled.

52. Apparatus according to claim 49, wherein one or more of the rigid links comprises an additional shank and fluke member, the additional shank and fluke member having respective first and second surfaces arranged with respect to one another such that under the normal working conditions the interaction between the bed material and the respective first and second surfaces generates opposing forces such that the apparatus is maintained at the predetermined depth during use.

53. Apparatus according to claim 52, wherein the second surface of the additional fluke member is substantially wider in cross section with respect to the towing direction, than the first surface of the additional shank.

54. Apparatus according to claim 34, wherein the apparatus further comprises one or more further interaction surfaces adapted in use to interact with the bed material so as to generate forces of a similar sense to either the first and/or the second surfaces.

55. Apparatus according to claim 54, wherein the forces generated are of a similar sense to those generated by the fluke member.

56. Apparatus according to claim 55, wherein the further interaction surfaces are arranged as wings.

57. Apparatus according to claim 56, wherein each wing is arranged such that, when the apparatus is arranged in use in a starting position on the surface of the bed material, the wing makes an angle of between 30 and 55 degrees with respect to the bed material surface.

58. Apparatus according to claim 34, wherein, when the apparatus is arranged in use in a starting position on the surface of the bed material, the apparatus is adapted according to the bed material type such that the second surface is at an angle of between about 30 and 50 degrees to the surface of the bed material.

59. Apparatus according to claim 58, wherein the angle is in the range 30 to 35 degrees.

60. Apparatus according to claim 58, wherein the angle is in the range 40 to 55 degrees.

61. Apparatus according to claim 60, wherein the angle is substantially 45 degrees.

62. Apparatus according to claim 34, wherein under normal working conditions, a component of the towing direction resolved onto the second surface of the fluke member is at an angle of 10 degrees or less with respect to the towing direction.

63. Apparatus according to claim 62, wherein the component resolved onto the second surface is at an angle of substantially 2 degrees with respect to the towing direction.

64. A method of burying a cable or pipe in a bed material at a certain depth, the method comprising:
towing apparatus according to claim 34 wherein the apparatus is arranged to plough a furrow at the certain depth; and,
supplying the cable or pipe to the furrow.

65. A method according to claim 64, wherein the cable or pipe is supplied from dispensing means aboard the apparatus.

66. A method according to claim 65, further comprising the step of positioning the apparatus on the surface of the bed material prior to towing, such that when the towing step is performed, the apparatus interacts with the bed material and moves to the predetermined depth.

67. A method according to claim 65, further comprising towing the apparatus using a towing means.

68. A method according to claim 67, wherein the towing means is a remotely operated vehicle.

69. A method according to claim 68, wherein the cable or pipe is supplied from dispensing means aboard the remotely operated vehicle.

70. A method according to claim 67, wherein the towing means is a surface vessel.

* * * * *